United States Patent

Jones

[11] 3,800,538
[45] Apr. 2, 1974

[54] MASTER CYLINDERS FOR HYDRAULIC BRAKING SYSTEMS
[75] Inventor: Peter Jones, Birmingham, England
[73] Assignee: Girling Limited, Birmingham, England
[22] Filed: Mar. 21, 1972
[21] Appl. No.: 236,600

[30] Foreign Application Priority Data
Apr. 2, 1971 Great Britain.................... 8555/71

[52] U.S. Cl...................... 60/562, 60/581, 188/345
[51] Int. Cl............................................. F15b 7/08
[58] Field of Search........... 60/54.5, 54.6 E, 54.6 R, 60/562, 581; 188/345

[56] References Cited
UNITED STATES PATENTS
3,423,940   1/1969   Brand................................ 60/54.6 E Primary Examiner—Irwin C. Cohen
Assistant Examiner—A. M. Zupcic
Attorney, Agent, or Firm—Scrivener & Parker Scrivener & Clarke

[57] ABSTRACT

An hydraulic master cylinder of the triple type in which three separate pressure spaces are defined with a cylinder bore between adjacent ends of three pistons, and the inner end of the innermost piston and the closed end of the cylinder bore. A body defining the cylinder bore is constructed from at least two separate parts, each provided with a bore portion. At least one piston works only in the bore portion in one body part, and at least one other piston works only in the bore portion in the other body part.

6 Claims, 1 Drawing Figure

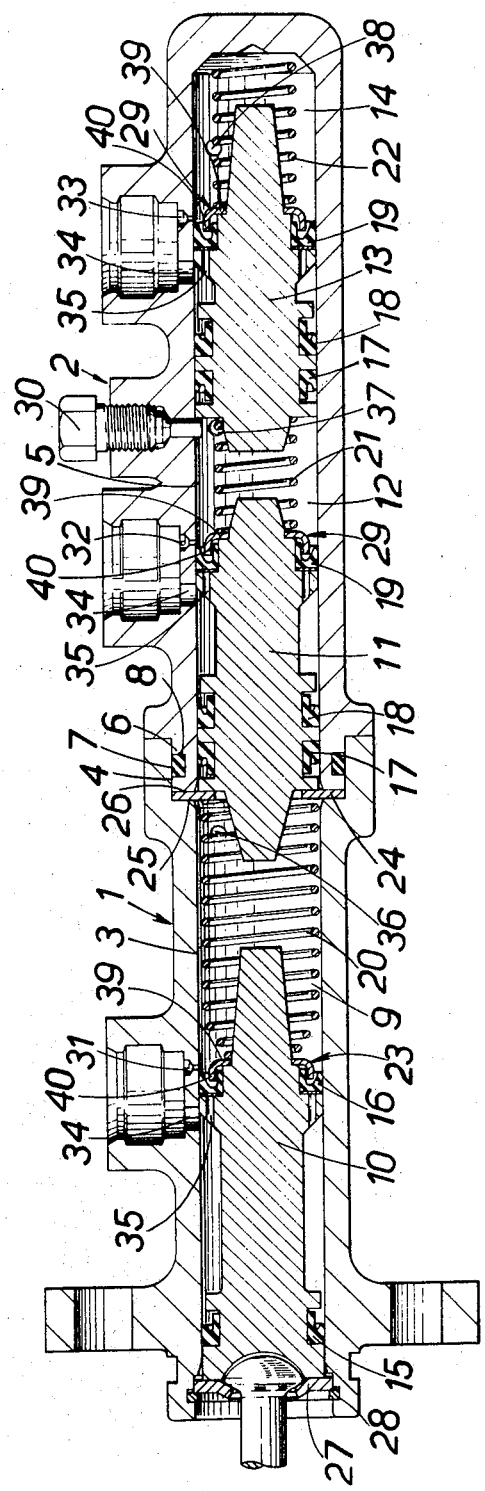

MASTER CYLINDERS FOR HYDRAULIC BRAKING SYSTEMS

SPECIFIC DESCRIPTION

This invention relates to master cylinders for hydraulic braking systems of the kind shown as triple master cylinders in which hydraulic fluid under pressure can be supplied to a first hydraulic brake circuit from a first pressure space between a positively actuated main first piston and a floating second piston, to a second brake circuit from a second pressure space between the floating second piston and a floating third piston, and to a third brake circuit from a third pressure space between the floating third piston and one end of the cylinder and, when the pistons are in their fully retracted positions, the three pressure spaces are adapted to be placed in communication through normally open valves or ports in the cylinder wall or in the closed end of the cylinder with a common or individual reservoirs for fluid and, when the pistons are advanced in the cylinder initial movement of the piston causes the pressure spaces to be isolated and, thereafter, additional movement of the pistons in the same direction is adapted to pressurise fluid in the pressure spaces.

When the triple master cylinder of the kind set forth is installed in an hydraulic braking system the brake circuits are connected to wheel brakes in any convenient manner such that, when the master cylinder is operated, the circuits can supply fluid under pressure to hydraulic actuators of the same and/or different wheel brakes, or brakes on the same wheel or different pairs of wheels. One convenient arrangement is described in specification of our co-pending cognate patent application Nos. 7761/71 and 28844/71 in which one pressure space is connected to one of a pair of wheel cylinders of each front wheel brake of a vehicle, another pressure space is connected to the other of each pair of wheel cylinders of each front wheel brake of the vehicle, and the remaining pressure space is connected to the wheel cylinders of the brakes of the rear wheels.

According to our invention, in a triple master cylinder of the kind set forth a body housing the pistons is constructed from at least two separate parts and each body part is provided with a longitudinally extending bore, at least one piston works only in the bore in one body part and at least one other piston works only in the bore in another body part.

By ensuring that the pistons work only in the bores in the separate body parts in which they are housed has the advantage that it is not essential to ensure that the bores are concentric. Furthermore machining of the entire cylinder bore is facilitated as the effective length of the bore in each body part is substantially less than that of the entire bore.

Preferably the body is of two-part construction with one piston working only in one body part and the other pistons working only in the other body part.

Conveniently the first piston works in one body part, and the two other pistons work in the other body part.

The pistons are urged into their retracted positions by separate return springs housed in pressure spaces. A stop defining the retracted position of the floating second piston may be clamped between the mating faces of the two body parts.

Conveniently the return spring located in the pressure space between opposite ends of the pistons on opposite sides of the mating faces of the body parts acts between one piston which may comprise the main first piston or the floating second piston, and an abutment ring which extends radially into the cylinder bore and which is clamped between the mating faces of the body parts. The abutment ring may also comprise a stop defining the retracted position of the piston on the opposite side of the mating faces.

Preferably the return spring located in each other pressure space abuts at opposite ends between the pistons defining that pressure space. Thus both mechanical and hydraulic connections are provided between those pistons. The pistons are not otherwise connected or coupled together, and thus it is not necessary to maintain the pistons concentric one with another.

One embodiment of our invention is illustrated in the single FIGURE of the accompanying drawings, which is a longitudinal section through a triple master cylinder for an hydraulic braking system.

As illustrated in the accompanying drawings the body of the master cylinder comprises two separate body parts 1 and 2. The body part 1 is formed with an open-ended longitudinal bore 3 having at one end a counterbore 4. The body part 2 has a longitudinal bore 5 which is closed at its outermost end. The opposite end portion of the body part 2 is reduced in diameter at 6 and is received within the counterbore 4. A resilient annular ring 7 housed in a groove 8 in the reduced diameter portion 6 forms a seal with the counterbore 4.

A first pressure space 9 is defined within the bore 3 between adjacent ends of a positively actuated main first piston 10 working in the bore 3 and a floating second piston 11 working in the bore 5. A second pressure space 12 is defined within the bore 5 between the inner end of the floating second piston 11 and an adjacent end of a floating third piston 13 which works in a portion of the bore 5 between the piston 11 and the closed end of the body part 2. A third pressure space 14 is defined within the bore 5 between the inner end of floating third piston 13 and the closed end of the body part 2.

The main first piston 10 is provided with an intermediate portion of reduced diameter at the opposite ends of which are located a pair of axially spaced annular sealing rings 15 and 16 of generally C-shaped outline for engagement with the bore 3.

Similarly each floating second and third piston 11 and 13 is provided with an intermediate portion of reduced diameter. A pair of annular generally C-shaped lip seals 17 and 18 are located in back-to-back relationship at the outer end of the reduced diameter portion of each piston 11 and 13, and a single annular sealing ring 19 of generally C-shaped outline is located at the forward end of each floating piston 11 and 13.

As illustrated in the drawings the pistons 10, 11 and 13 are urged into retracted position by means of helical compression return springs 20, 21 and 22 each located in a respective pressure space 9, 12 and 14.

The compression spring 20 acts between a retainer 23 on the piston 10 forwardly of the seal 16 and over a complete annular face of an annular abutment plate 24 which extends into the cylinder bore and which is clamped between mating faces 25 and 26 at adjacent ends of the body parts 1 and 2. The compression spring 20 urges the piston 10 rearwardly into engagement with a backstop at the open rear end of the body part 1 formed by an annular plate 27 held in position by means of a circlip 28.

Compression springs 21 and 22 act at opposite ends between adjacent ends of the pistons 11 and 13, and between the outer end of the piston 13 and the closed end of the bore 5 respectively. Specifically the outer end of end spring 21,22 abuts against a retainer 29 at the inner end of each piston 11,13 forwardly of the seal 19. The compression spring 21 urges the piston 11 rearwardly into engagement with a backstop defined by the abutment plate 24. The spring 22 urges the piston 13 rearwardly into engagement with a backstop defined by the inner end of a screw 30 which is screwed into an opening in the wall of the body part 2 and projects into the bore 5.

In the retracted position shown in the drawings each pressure space 9, 12 and 14 is in communication with a common reservoir for fluid or with a separate reservoir through a recuperation port 31, 32, 33 located in the wall of a body part forwardly of the seal 16 or 19 at the forward end of that piston which defines the rearward end of that pressure space. The reduced diameter portion of each piston is at all times in communication with the or one reservoir through a bleed port 34 and the rear face of each seal 16 or 19 is also in communication with an annulus defined between the bore and the reduced diameter portion of that piston through an axial passage 35 in the piston.

When the master cylinder is operated from a foot pedal the main first piston 10 is advanced in the bore 3 and the seal 16 closes the port 31 to isolate the pressure space 9 from the reservoir. Simultaneously or sequentially the pistons 11 and 13 are also advanced or the bore 5 by means of an hydraulic connection between the pistons 10 and 11, and an hydraulic and mechanical connection between the pistons 11 and 13 due to the presence of the spring 21. Thus the ports 32 and 33 are closed by the seals 19. No mechanical connection is provided between the pistons 10 and 11 since the end of the spring 20 remote from the piston 10 abuts against the abutment place 24.

Further movement of the pistons 10, 11 and 13 in the same direction pressurises the fluid in the pressure spaces 9, 12 and 14 which is delivered to the brake circuits through outlet ports 36, 37 and 38 in the walls of the body parts in communication with the pressure spaces 9, 12 and 14.

The spring retainers 23 and 29 each comprises an annular ring of generally L section having a radial flange 39 and an axially extending flange 40. Each axially extending flange 40 is directed rearwardly and is received within a space defined within the seal 16, 19 at that end of the piston but is spaced from the seal itself. The axially extending flanges 40 serve to prevent the seals 16 and 19 from tilting relative to the pistons 10, 11 and 13 and sticking in the bores 3 and 5 when the pistons are retracted under the influence of the return springs 20, 21 and 22.

As illustrated the compression spring 20 is of a constant diameter for a major portion of its axial length but a portion of the spring terminating at the end in abutment with the retainer 29 is of frusto-conical outline with the free end being of smaller diameter. Alternatively the compression spring 20 may be of frusto-conical outline for the whole of its length with the end of smaller diameter engaging with the retainer 29.

I claim:

1. In an hydraulic master cylinder of the triple type comprising a cylinder body having a longitudinally extending bore which is open at one end and closed at an opposite end, a positively actuated first piston, a floating second piston, and at least one floating third piston all working in said bore, a first pressure space defined in said bore between adjacent ends of said first and second pistons, a second pressure space defined in said bore between adjacent ends of said second and third pistons, and a third pressure space defined in said bore between said third piston and said closed end of said bore, a first normally-open valve means for controlling communication between said first pressure space and first inlet means for connection to fluid reservoir means, a second normally-open valve means for controlling communication between said second pressure space and second inlet means for connection to fluid reservoir means, a third normally-open valve means for controlling communication between said third pressure space and third inlet means for connection to fluid reservoir means, and return springs housed in said pressure spaces for urging said pistons into retracted positions in which said valve means are normally open, the arrangement being such that when said pistons are advanced in said bore in a first direction, initial movement thereof causes said pressure spaces to be isolated from said inlet means and, thereafter, additional movement of said pistons in said first direction is adapted to pressurize fluid in said pressure spaces, the improvement wherein said cylinder body comprises at least two separate body parts each provided with longitudinally extending bore portions, at least one piston being adapted to work only in said bore portion of one of said body parts, and at least one piston being adapted to work only in said bore portion of the other of said body parts, and wherein an abutment ring having opposite faces is clamped between mating faces of said body parts and extends radially into said cylinder bore, one of said opposite faces of said abutment ring defining an abutment for one end of one of said return springs of which the opposite end acts on an adjacent end of that piston which is adjacent to said one face.

2. An hydraulic master cylinder as claimed in claim 1, wherein a stop clamped between mating faces of said body parts defines said retracted position of said second piston.

3. An hydraulic master cylinder as claimed in claim 1, wherein the other of said opposite faces of said abutment ring comprises a stop defining said retracted position of that piston adjacent to said other face.

4. An hydraulic master cylinder as claimed in claim 1, wherein said piston against which said one return spring acts comprises said main first piston.

5. An hydraulic master cylinder as claimed in claim 1, wherein said piston against which said one return spring acts comprises said second piston.

6. An hydraulic master cylinder as claimed in claim 1, wherein at least one of said return springs act between adjacent ends of an adjacent pair of said pistons.

* * * * *